(No Model.)

C. E. DRESSLER.
ELECTRIC MOTOR AND GENERATOR.

No. 440,700. Patented Nov. 18, 1890.

WITNESSES:
Francis P. Reilly
H. C. Evans

INVENTOR
Charles E. Dressler
BY R. M. Voorhees
ATTORNEY.

UNITED STATES PATENT OFFICE.

CHARLES E. DRESSLER, OF NEW YORK, N. Y.

ELECTRIC MOTOR AND GENERATOR.

SPECIFICATION forming part of Letters Patent No. 440,700, dated November 18, 1890.

Application filed May 12, 1890. Serial No. 351,419. (No model.)

*To all whom it may concern:*

Be it known that I, CHARLES E. DRESSLER, of the city of New York, in the county and State of New York, have invented certain new and useful Improvements in Electric Motors and Generators, which invention or improvements are fully set forth and illustrated in the following specification and accompanying drawings.

The motor illustrated in said accompanying drawings contains certain modifications of the invention described in my pending application, Serial No. 347,413, filed April 10, 1890.

The object of this invention is to simplify the construction, increase the efficiency, and enlarge the application to useful purposes of electric motors and generators.

The invention will first be described in detail, and then particularly set forth in the claims.

Figure 1:
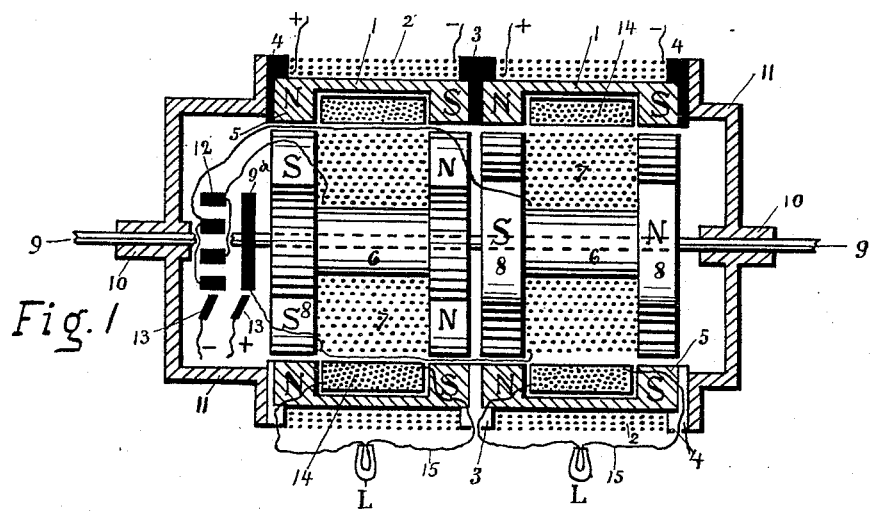
Figure 2:
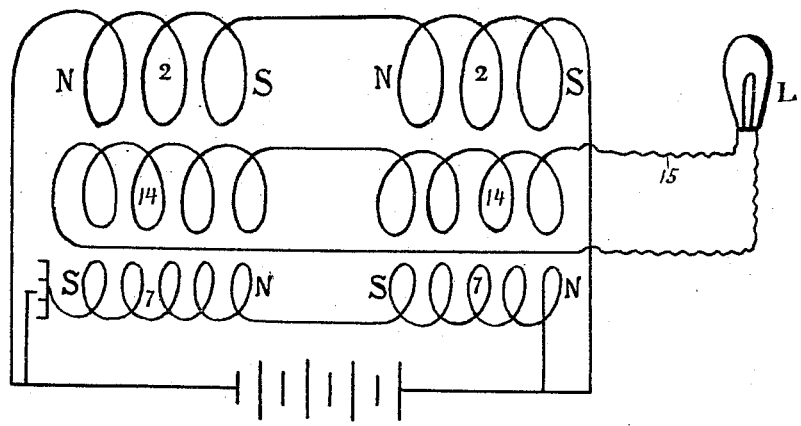
Figure 3:
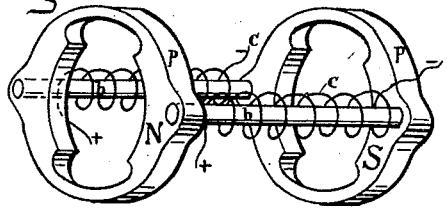

In the accompanying drawings, Figure 1 is a transverse longitudinal section through an electric motor, showing an interposed secondary or induction coil forming one of the features of this invention. Fig. 2 is a diagram or sketch illustrative of the relative arrangements and connections of the parts shown in Fig. 1. Fig. 3 shows in perspective a modified form of field-magnet, and Fig. 4 details of construction in end view of field and armature magnets hereinafter particularly described.

In said figures the several parts are indicated by reference numbers and letters, as follows:

Referring first to Fig. 1, two outer cylinders or outer spools 1, preferably of soft iron, are circumferentially wound with, preferably, insulated copper wire 2, the whole forming a "field" of two field-magnets of cylindrical or annular shape, secured together in line of axis in any suitable manner through an interposed non-magnetic ring or washer 3, and provided each with pole-pieces 5. Within said field-magnets is set the armature 6, preferably of soft iron, wound circumferentially with insulated wire 7 between its pole-pieces 8. The two field-magnets 1, forming practically one outer hollow cylinder, are secured in any suitable manner to a foundation or bed-plate, and the armature 6 is provided with a rotary shaft 9, journaled in bearings 10 in end pieces or caps 11, secured in any suitable manner through non-magnetic rings or washers 4 to the outer ends of the cylinders 1. A collecting-ring $9^a$ and a commutator 12 are shown on the shaft 9 and brushes 13, all suitably placed to perform their well-known offices.

In Fig. 3 a single field-magnet of modified form is shown, which, instead of being a circumferentially-wound cylinder, as shown in Fig. 1, is composed of annular pole-pieces $p$, united by core-bars $b$, circumferentially wound with insulated wire $c$. One, two, or more of said core-bars may be used, as desired.

Figure 4:
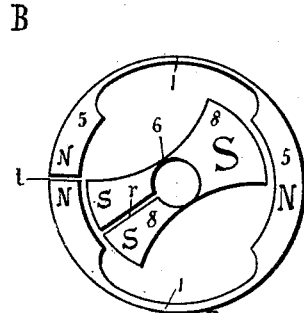

In Fig. 4 the field-magnets 1 are shown cut or split longitudinally, as at $l$, and the armature 6 cut or split radially, as at $r$. The pole-pieces $p$ in Fig. 3 may be similarly split, and the split armature 6 may be used in combination with a field magnet or magnets made like that shown in Fig. 3, instead of in combination with a field magnet or magnets 1. (Shown in Fig. 1.) The object of so splitting or dividing field and armature magnet is to diminish or prevent such eddy or local currents as are commonly known under the general term of "self-induction currents." With the same object in view, if desired, the common practice of insulated lamination may be adopted in constructing the cores and magnets of this machine. A special method of armature-lamination is shown and described in my pending application, Serial No. 347,917, filed April 14, 1890.

Referring again to Fig. 1, in addition to the parts already described, secondary or induction coils 14 are shown interposed between armature and field-magnet. Connected by wires 15 to said coils 14 are incandescent lamps L, the conducting-wires 15 passing through the non-magnetic rings 3 4, the parts of which rings through which said wires pass being unshaded or uncut by section-lines for better showing the passage of the wires 15 therethrough.

The use and purpose of such coils as 14 will now be described in connection with the diagram Fig. 2, in which the numbers 14 indicate similar coils, and 2 and 7, respectively, the field and armature coils; L, an incandescent lamp, and B a battery, dynamo, or other primary source of electricity. The letters N S, wherever they occur, indicate "north" and "south" or opposite polarity in the several parts indicated by them. The several connections being made by wires, as indicated in Figs. 1 and 2, from a dynamo or battery B to the several parts, including field and armature magnets, heretofore described, the armature 6 and its shaft 9 will be put into rapid rotation, when the necessary work will be performed by the power conveyed by said shaft. This rotation of the armature 6 will excite the coils 14 by its inductive action, and the current so induced will then be conducted by the wires 15 to the lamps L, the relative sizes of wire in armature and coils 14 determining the relative potentials and volumes of the direct or power current and the induced current, or, in other words, said currents' respective numbers of volts and ampères. It will be observed, therefore, that this machine will supply a current for illumination and other purposes at the same time that it is doing work as a motor, and that the former current is an independent induction-current obtained through a wire not in electrical connection with the armature or field coils of the motor or with the wires which supply the motor with its actuating-current. The advantages of thus utilizing electric energy are manifest to those skilled in the art, and the uses to which this induced current can be put readily suggest themselves. The motor may be used to develop a divided power by day and both power and light by night. While the motor is thus doing work as a prime mover said induced current may be utilized to "recharge" a storage battery among other uses to which it may be put if the inducing current in the armature be a continuous current. If the armature be energized by a direct current, the current thereby induced in the coils 14 will be a continuous pulsatory current as long as the armature revolves; but said direct current will not excite the coils 14 if the armature should not rotate unless an interrupter or "current-reverser" be added; but if the armature be energized by an alternating current then the current induced in the coils 14 will be an alternating current and will induce an alternating current in said coils whether the armature rotate or not if the current be supplied, in which case, of course, said current, being alternating, cannot be used for recharging a storage-battery unless some means or contrivance be introduced between the coils 14 and the battery for the purpose of transmuting such alternating current into a continuous current.

This machine, with or without the induction-coil, by dispensing with its commutator, may be operated as a motor by an alternating current, the motor itself being, in fact, from its construction, a current "converter" or transformer. The alternating current of a dynamo need but be connected to the armature of this machine, when the armature will start unloaded, its pole-pieces being attracted to the field pole-pieces. The rotation continuing, the induction thus generated in the field-magnets will energize them as an exciting current, and the alternating current in the armature will of itself effect the required "commutations" of current to continue the rotations in doing the work within the necessary limiting conditions of size of machine and power of current. The construction of this machine, therefore, is such that many of the internal resistances encountered in other machines are either eliminated or converted to effective use. Instead of wire, strips of copper suitably insulated may be used for the coils of this machine, as has heretofore been done in making the coils of other machines.

Having thus fully described my said invention, I claim—

1. An electric motor having combined therein the following-named elements: a field magnet or magnets, a rotary electro-magnet armature, and an induction-coil helically wound at right angles to the armature's axis and inductively excited by the energized armature, whereby power is transmitted by said armature's rotary shaft, while an electric current suitable for lighting or other work is simultaneously induced in said induction-coil, substantially as set forth.

2. An electric motor having combined therein the following-named elements: a field magnet or magnets, an electro-magnet armature, and a stationary induction-coil annularly surrounding the armature at right angles to its axis and inductively excited by the armature's energized condition, whereby the motor may be utilized as a converter, substantially as and for the purposes set forth.

CHARLES E. DRESSLER.

Witnesses:
FRANCIS P. REILLY,
THEO. H. FRIEND.